(12) United States Patent
Obrecht et al.

(10) Patent No.: US 11,683,332 B2
(45) Date of Patent: Jun. 20, 2023

(54) METHOD AND APPARATUS FOR MEASURING INFORMATION SYSTEM DEVICE INTEGRITY AND EVALUATING ENDPOINT POSTURE

(71) Applicant: Six Engines, LLC, Austin, TX (US)

(72) Inventors: Mark Eric Obrecht, Austin, TX (US);
Robert Myers, Austin, TX (US);
Taylor Crumpton, Austin, TX (US)

(73) Assignee: Six Engines, LLC, Austin, TX (US)

( * ) Notice: Subject to any disclaimer, the term of this patent is extended or adjusted under 35 U.S.C. 154(b) by 179 days.

(21) Appl. No.: 17/000,306

(22) Filed: Aug. 22, 2020

(65) Prior Publication Data

US 2021/0058422 A1 Feb. 25, 2021

Related U.S. Application Data

(60) Provisional application No. 62/890,519, filed on Aug. 22, 2019.

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 8,370,947 B2* | 2/2013 | Zaitsev | H04L 63/1433 726/25 |
| 10,659,488 B1* | 5/2020 | Rajasooriya | H04L 63/1433 |
| 2004/0123141 A1* | 6/2004 | Yadav | H04L 63/0227 726/23 |
| 2006/0010493 A1* | 1/2006 | Piesco | H04L 63/1416 726/23 |
| 2006/0143709 A1* | 6/2006 | Brooks | H04L 63/1441 726/23 |
| 2009/0106844 A1* | 4/2009 | Yoon | H04L 41/08 726/25 |
| 2016/0283994 A1* | 9/2016 | Edgington | G06F 16/29 |
| 2017/0041343 A1* | 2/2017 | Wong | H04L 63/20 |
| 2018/0032736 A1* | 2/2018 | Inagaki | G06F 21/577 |
| 2021/0037038 A1* | 2/2021 | Alsharif | G06F 21/577 |

* cited by examiner

*Primary Examiner* — Kaveh Abrishamkar

(57) ABSTRACT

Methods, devices, and systems disclosed herein measure endpoint user security event susceptibility (e.g., a malware infection) and provide information for endpoint/user posture evaluation. A relatively small software application may be installed using, for example, a systems management push system where the software runs on each endpoint system and reports back to a central repository or base system. The software runs on machines that it is pushed to and generates a score for that endpoint. That score is a quantification of endpoint user security risk, i.e., the likelihood that a particular endpoint is likely to be the source of a security event at some point in the future. This information may be used to generate a Relative Score for each endpoint so that the endpoints can be ranked from most secure to least secure and an Absolute Score so that a given distributed system can be compared to other distributed systems.

18 Claims, 2 Drawing Sheets

METHOD AND APPARATUS FOR MEASURING INFORMATION SYSTEM DEVICE INTEGRITY AND EVALUATING ENDPOINT POSTURE

RELATED APPLICATIONS

This application claims the benefit of U.S. Prov. Pat. App. No. 62/890,519, filed on Aug. 22, 2019. Each application referenced in this paragraph is incorporated by reference as if set forth fully herein.

BACKGROUND

Field of the Disclosure

The present disclosure relates generally to methods and devices for detecting endpoint and/or user susceptibility to create a security event in information handling systems, and more particularly, methods and devices for scoring and ranking endpoints and/or users based on the behavioral characteristics of the user and the system.

Description of the Related Art

Over the past forty years, since the advent of Windows as the preeminent operating system for personal computers (and, to a lesser extent, UNIX operating systems for end users), billions of dollars have been invested in protecting computer systems from attack. Hundreds of software companies compete in the security space, providing various products designed to protect systems in some specific ways. For example, security companies may provide software packages designed to detect and prevent installation of malware, i.e., to neutralize an external threat before it infects a machine or system. Other companies sell products designed to treat infected machines and prevent the proliferation of malware once it has already infiltrated a system.

In large companies having several hundred to several thousand computing employees, a distributed system having a commensurate number of computers or virtual desktops is often required. In order to centrally manage such a large number of systems, many companies utilize information technology (IT) departments engaged in systems management and security management, which is the enterprise-wide administration of distributed systems and virtual desktops. Systems management and security may involve, for example, software inventory and installation, virus detection and prevention, user activity logging, security management, etc. Centralized management allows IT departments to monitor, analyze, and manipulate systems on the distributed network with the primary goals of improving throughput and preventing attack.

Security assessment services is a mature billion-dollar industry traditionally with consulting engagements designed to assess nearly all aspects of an enterprise distributed system, such as network perimeter, email and server, cloud, security posture, incident handling, identity/access management, security operations, and many others. However, there is a need in the industry for a product/service that evaluates the biggest threats to the distributed system: the end user and system configuration. This need may be addressed by devices and methods that provide organizations (traditionally corporations and consulting firms) with a snapshot of device integrity across an entire user population by quantifying individual endpoint user security risk (i.e., identifying the systems/users that comprise the "weakest links" in a user population). Additionally, a "sophisticated user" score may also be summated.

DETAILED DESCRIPTION OF THE DRAWINGS

DETAILED DESCRIPTION OF THE DISCLOSURE

Figure 1:
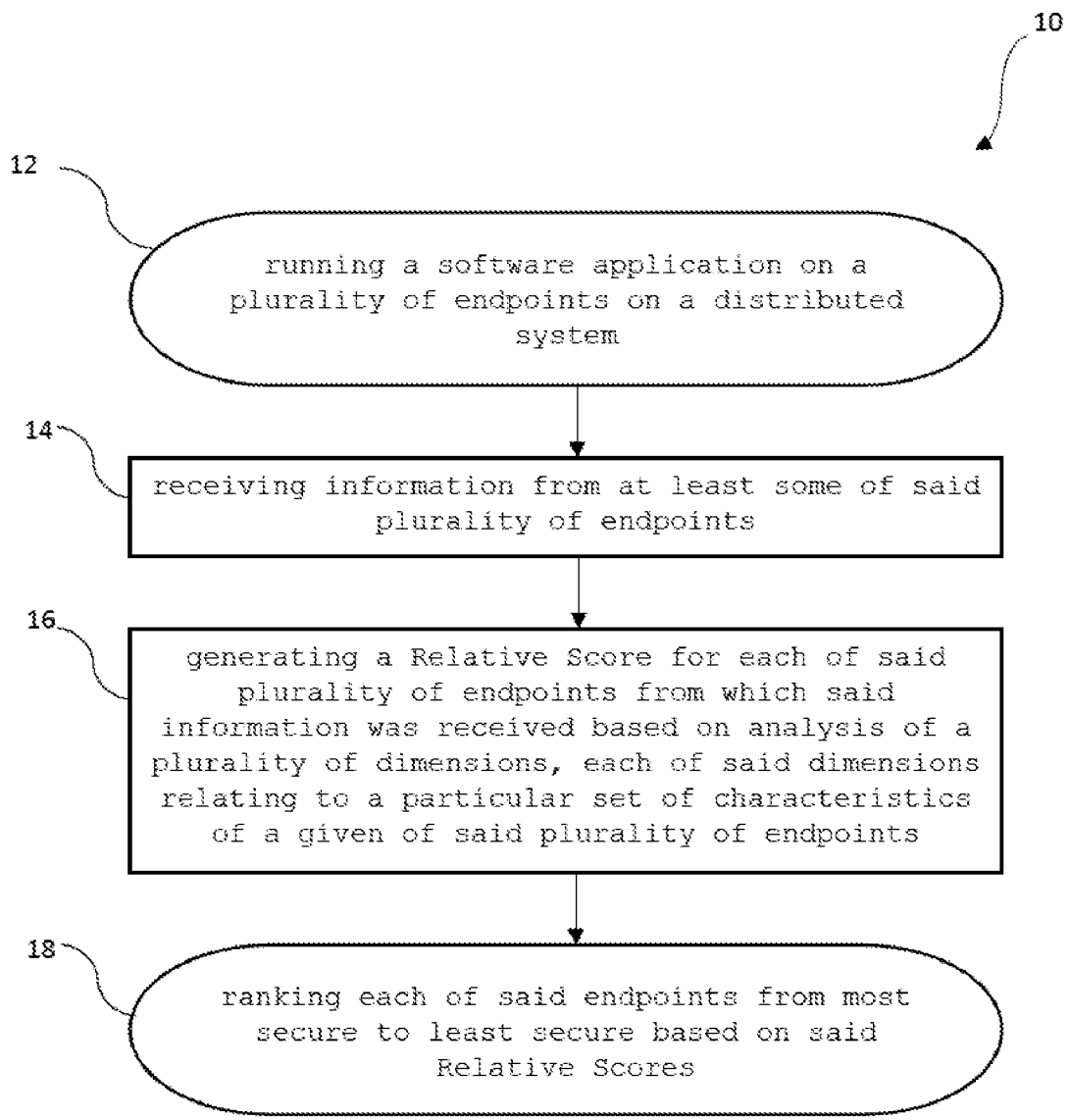
FIG. 1 is a flow chart showing a method of identifying endpoint user susceptibility across a distributed computer system according to an embodiment of the present disclosure.

Embodiments of the present disclosure include methods and devices for identifying endpoint user security event susceptibility (e.g., a malware infection) and providing information for endpoint (including endpoint user) posture evaluation. In one embodiment, a relatively small software application may be installed using, for example, a systems management push system where the software runs on each endpoint system, reports back to a central repository or base system, and then, immediately afterward, is deleted on each system, with the entire process completed in a few seconds or less. In another embodiment, the software remains on the machine after it runs so that it may be easily activated again without having to reload the software on a particular system.

The software application is deliverable in a relatively small package. In one embodiment, the software is less than 5 MB. In another embodiment, the software is less than 3 MB. And in yet another embodiment, the software is less than 2 MB.

The software runs on any number of machines that it is pushed to and generates a score for that endpoint. That score is the quantification of endpoint user security risk, i.e., the score relates to the likelihood that a particular endpoint is likely to be the source of a security event at some point in the future. This endpoint security score inherently includes a component related to the endpoint and a component related to the endpoint user(s). Once the software has been run on all or a subset of the machines in a given deployment, each individual machine that has been analyzed is ranked from most secure to least secure (i.e., most worrisome). The quantification of this information (known as the Relative Score) immediately communicates to an IT department, an outside systems management consultant, or another group, which endpoint users pose the biggest threat to the distributed system, allowing resources to be more efficiently dedicated to those high-risk users/machines.

Device integrity is measured at each machine that runs the software using a plurality of dimensions, each of which focuses on a particular set of characteristics of the machine. Some of the dimensions that are analyzed include: management (user hygiene); forensic readiness; defense; insider threat indicia; spear phishing surface; exfiltration potential; performance; dark web footprint; valuable employee indicia; and physical security. Each of these dimensions is discussed in more detail herein. It is understood that the dimensions explicitly disclosed herein are exemplary. A person of skill in the art will appreciate that many different dimensions other than those disclosed herein are possible.

Throughout this disclosure, the embodiments illustrated should be considered as exemplars, rather than as limitations on the present disclosure. As used herein, the term "invention," "device," "apparatus," "method," "disclosure," "present invention," "present device," "present apparatus," "present method," or "present disclosure" refers to any one of the embodiments of the disclosure described herein, and any equivalents. Furthermore, reference to various features of the "invention," "device," "apparatus," "method," "disclosure," "present invention," "present device," "present apparatus," "present method," or "present disclosure" throughout this document does not mean that all claimed embodiments or methods must include the reference features.

Although the ordinal terms first, second, third, etc., may be used herein to describe various elements, components, and/or steps, these elements, components, and/or steps should not be limited by these terms. These terms are only used to distinguish one element, component, or step from another. Thus, unless expressly stated otherwise, a first element, component, or step discussed below could be termed a second element, component, or step without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

FIG. 1 is a flow chart showing a method 10 of identifying endpoint user susceptibility across a distributed computer system according to an embodiment of the present disclosure. The method 10 comprises the following steps. In step 12, a software application runs on a plurality of endpoints on a distributed system. As shown in step 14 information is received from at least some of the endpoints. In step 16, a Relative Score is generated for each of the endpoints from which information was received based on an analysis of a plurality of dimensions, each of the dimensions relating to a particular set of characteristics of a given of the plurality of endpoints. Next, in step 18 each of the endpoints is ranked from most secure to least secure based on the Relative Scores.

Figure 2:
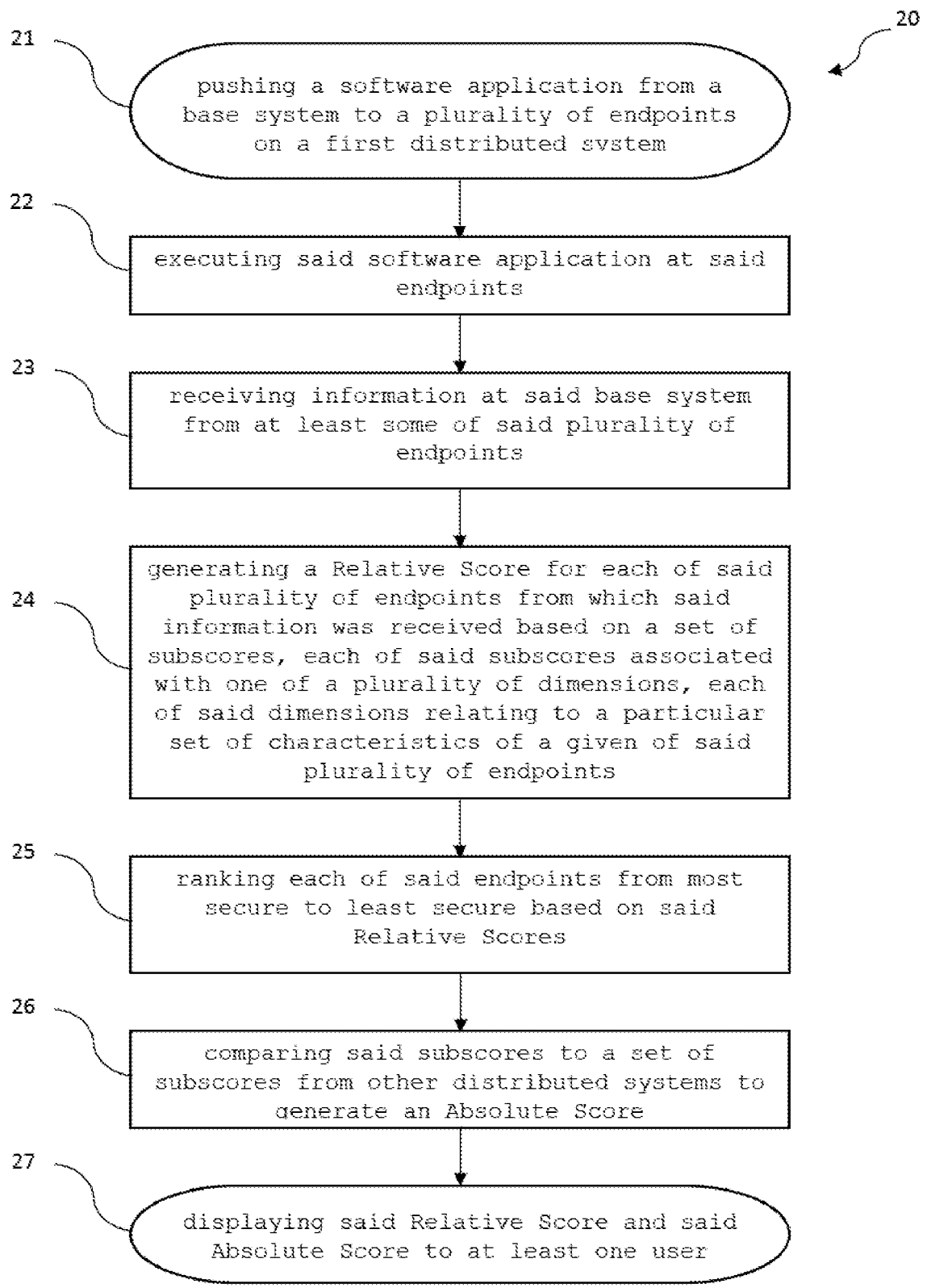
FIG. 2 is a flow chart showing set of instructions fixed in a non-transitory computer-readable medium according to an embodiment of the present disclosure.

FIG. 2 is a flow chart showing set of instructions fixed in a non-transitory computer-readable medium according to an embodiment of the present disclosure. The term "non-transitory," as used herein, is intended to describe a computer-readable storage medium (or "memory") excluding propagating electromagnetic signals, but is not intended to otherwise limit the type of physical computer-readable storage device that is encompassed by the phrase computer-readable medium or memory. For instance, the term "non-transitory computer readable medium" is intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The instructions 20 provide a series of steps for execution on a computer or information system. In step 21, software is pushed from a base system to a plurality of endpoints on a first distributed system. In step 22, the software application is executed at said endpoints. As shown in step 23, information is received at the base system from at least some of the plurality of endpoints. In step 24, a Relative Score is generated for each of the plurality of endpoints from which the information was received based on a set of subscores, with each of the subscores being associated with one of a plurality of dimensions, and each of the dimensions relating to a particular set of characteristics of a given of the plurality of endpoints. In step 25, each of the endpoints is ranked from most secure to least secure based on the Relative Scores. In step 26, the subscores are compared to a set of subscores from other distributed systems to generate an Absolute Score. Then, in step 27, the Relative Score and the Absolute Score are displayed to at least one user.

In certain embodiments, the subscores may be based at least partially on a comparison of at least one characteristic of one of said endpoints related to a given dimension and an acceptable benchmark value of that characteristic. For example, various security settings at an endpoint may be compared to a set of recommended or ideal settings. In this example, the more settings which differ from the recommended/ideal settings would generate a subscore that will ultimately negatively affect the Relative Score associated with that endpoint.

As previously noted, information for the endpoints is analyzed using at least one dimension and, in most cases, a plurality of dimensions. Examples of such dimensions are detailed below.

Management (User Hygiene)

Analysis of the management of a particular endpoint system utilizes information relating to the "computing hygiene" of a particular machine. Because the same user (or users) typically work on the same machine, the analysis also inherently considers the computing habits of the user(s) of that machine. The analysis uses at least one, and usually several, characteristics or attributes of the analyzed system. For example, some of the attributes that may be analyzed in this dimension are the number of packed files, the number of processes running without version data, and the age of the system. Each of these characteristics is scored, weighted, and summated to provide a Management (User Hygiene) subscore. It is understood that the attributes disclosed herein are merely exemplary; many other attributes relating to the management (user hygiene) dimension are contemplated.

Forensic Readiness

Another dimension of the analysis of a particular endpoint machine is forensic readiness. This dimension is a measure of the ability of a particular machine to provide useful information if that machine is compromised by malware, a virus, or the like. Relevant information includes whether or not the operating system auditing/logging features are enabled (in many cases these critical features are not on by default) such that an investigator performing a forensic analysis on an infected machine is able to quickly gather and extract information related to machine operation and the malware on that machine. For example, some of the attributes that may be analyzed in this dimension include whether or not Superfetch is turned on, appropriate log sizes, and auditing enablement for various directories and registry keys. Many other attributes may also be included in the analysis. Thus, indirectly, the forensic readiness dimension provides a subscore that reflects how easily an infected machine can be diagnosed.

Defense

The defense dimension is quantified using information related to the defensive posture of a particular endpoint system. That is, this dimension quantifies how prepared a system is to defend itself. Information relating to this dimension includes the number and kind of security products running on the system and whether those products are up to date. Other relevant information includes whether a firewall is enabled, for example, the Windows standard firewall. Additional exemplary attributes that relate to the defense score include the status of the Windows Management Infrastructure (WMI), the enablement of the antivirus software, and the use of disk encryption. Many other attributes may factor into this subscore as well. Thus, the defense subscore is a measure of the defensive readiness of an endpoint system.

Insider Threat

The insider threat dimension includes several attributes of an endpoint system to quantify the likelihood that a particular user within a group is a malicious actor. Some of the information that relates to the insider threat subscore includes, for example, the presence of hacker tools and the presence of shredding software. Information relating to these and many other attributes may be used to generate the insider threat subscore.

Spear Phishing

Another subscore is generated which quantifies the risk of a particular user being victimized by a spear phishing attack. Spear phishing is a prominent email-borne variety of a standard phishing attack. Phishing attempts directed at specific individuals or companies have been called spear phishing. In contrast to bulk phishing, spear phishing attackers often gather and use personal information about their target to increase the probability of success. Some of the attributes that relate to the vulnerability of a particular system to spear phishing include, for example, the diversity of senders and the number of emails sent to a particular account with attachments. Many other attributes are possible.

Exfiltration

The exfiltration subscore quantifies how easily information can be siphoned off of a particular endpoint system. Some of the attributes that relate to this dimension are, for example, connections to foreign countries, split-tunneling of VPN, remote desktop enablement. Many other attributes are also possible.

Physical Security

The physical security subscore quantifies risk associated with various security settings on an endpoint computer such as, for example, whether the computer has nearby sharing enabled, notifications on lock screen, password on screensaver, and remote wipe software enabled. Many other related settings may factor into the physical security subscore as well.

The previously discussed dimensions are merely exemplary. Many other dimensions may be included, each of which can generate its own subscore. Some other possibilities include dimensions that relate to system performance, employee value, and the dark web.

A subscore is generated for each dimension that is analyzed. In one embodiment, the dimension subscores range from 0 to 100. In another, from −1 to 1. In yet another, the subscores and/or weights of those subscores are tuned using machine learning techniques. Each of the subscores are weighted and summated.

According to one embodiment, the scoring algorithm comprises an algorithm that includes an algebraic formula for determining two different scores: 1) a Relative Score; and 2) an Absolute Score.

Relative Score

The scoring algorithm is dependent on the individual subscores and the weights, $W_i$, associated with each subscore. The algebraic formula or equation can also be made arbitrarily complex, for example, to include associating weights to one or more combinations of subscores.

In one embodiment, the scoring algorithm includes an algebraic equation defined as a sum of weighted values. For example, the algebraic equation for the Relative Score can include an equation as given by:

$$\text{RELATIVE SCORE} = \Sigma_{i=1}^{M} i(W_i)$$

where M=the number of dimensions; i=the subscore associated with a particular dimension; and $W_i$=weight given to a particular subscore.

This score is calculated for each endpoint system within a given deployment and can then be normalized to a given range that is intuitive to a particular user, such as 1 to 100, for example. It is understood that many different formulae for weighting and summating the subscores to arrive at the Relative Score may be used.

Thus, each system within the deployment receives a Relative Score. Using these scores, a report may be generated which ranks the individual systems, and by implication the associated users, from most secure to least secure (i.e., most worrisome). This immediately communicates to an IT department, an outside systems management consultant, or another group, which endpoints pose the biggest threat to the distributed system, and suggests where resources are most efficiently allocated and/or the corrective actions that should be taken.

Absolute Score

An Absolute Score may then be calculated based on the individual subscores of all systems within the deployment. Similarly as with Relative Score, the Absolute Score can be normalized to particular range that clearly communicates the collective endpoint security risk across the entire user population. For example, the Absolute Score may range from 0 to 100, or from −1 to 1, or any other desired range. The Absolute Score may be expressed as a number or as a letter, for example, using the ubiquitous academic scale from A+ to F. Colors or any other indicators may be used as a ranking device (e.g., a "green system" indicating a good Absolute Score and a "red system" indicating a poor one). Once a critical mass of Absolute Scores have been accumulated from various organizations, the Absolute Score may be expressed as a percentile (e.g., an Absolute Score of 77%, indicating that the organization is more secure than 77% of all organizations that have been analyzed). Whether the score indicates that a given organization scores favorably or poorly in comparison to its peers, the information is always valuable to the organization. If the organization has a poor Absolute Score, then management will know that additional resources and attention should be paid to endpoint user security event susceptibility. In the event the organization scores well, then management will know that the department or group charged with fortifying the deployment are succeeding relative to other organizations.

Absolute Scores may be calculated in view of all organizations that have been analyzed or across any subset thereof. For example, a Fortune 500 company may only want to compare its Absolute Score to other Fortune 500 companies. In another example, an organization may want to be compared only against other companies of comparable size or similar market cap. In yet another example, an organization may want to be compared only to other companies in the same industry or sector (e.g., energy, financial services, manufacturing). Thus, the Absolute Score can be customized to provide a more meaningful snapshot of the organization's collective endpoint security.

Where the foregoing disclosure mentions that software (or code) performs an operation, it is understood that the information handling system performs the operation in response to the information handling system's execution of the software.

Although illustrative embodiments have been shown and described, a wide range of modification, change and substitution is contemplated in the foregoing disclosure and, in some instances, some features of the embodiments may be employed without a corresponding use of other features. Accordingly, all such modifications are intended to be included within the scope of the embodiments. Accordingly, it is appropriate that the appended claims be construed broadly.

We claim:

1. A method of identifying endpoint user susceptibility across a distributed computer system, comprising:
running a software application on a plurality of endpoints on a distributed system, wherein after said software application runs on one of said endpoints, said software application is erased from said one of said endpoints;
receiving information from at least some of said plurality of endpoints;
generating a Relative Score for each of said plurality of endpoints from which said information was received based on analysis of a plurality of dimensions, each of said dimensions relating to a particular set of characteristics of a given of said plurality of endpoints;
ranking each of said endpoints from most secure to least secure based on said Relative Scores.

2. The method of claim 1, wherein said Relative Score is based on a set of subscores, each of said subscores associated with one of said dimensions.

3. The method of claim 2, further comprising:
generating an Absolute Score based on a comparison of said subscores from each of said endpoints from which information was received and at least one different set of subscores from a different distributed computer system.

4. The method of claim 3, wherein said Absolute Score is expressed as a percentile which indicates that said distributed computer system is more secure than a percentage of a set of different distributed computer systems to which said distributed computer system was compared.

5. The method of claim 3, wherein said comparison is between a subset of distributed computer systems that share a common characteristic.

6. The method of claim 2, wherein said Relative Score is a weighted sum of said subscores.

7. The method of claim 1, wherein said software application is smaller than 5 megabytes (MB).

8. The method of claim 1, wherein said software application is smaller than 2 megabytes (MB).

9. The method of claim 1, wherein said at least one dimension is selected from a set of dimensions comprising management (user hygiene), forensic readiness, defensibility, insider threat indicia, spear phishing surface, exfiltration potential, performance, dark web footprint, and valuable employee indicia.

10. The method of claim 9, wherein said set of dimensions further comprises physical security.

11. The method of claim 1, wherein said at least one dimension comprises a management (user hygiene) dimension and a forensic readiness dimension.

12. The method of claim 1, wherein each of said dimensions comprises a comparison of at least one characteristic of one of said endpoints related to said dimension and an acceptable benchmark value of said characteristic.

13. A set of instructions fixed in a non-transitory computer-readable medium, comprising:
pushing a software application from a base system to a plurality of endpoints on a first distributed system;
executing said software application at said endpoints;
erasing said software application from each of said endpoints after said software application executes at said endpoint;
receiving information at said base system from at least some of said plurality of endpoints;
generating a Relative Score for each of said plurality of endpoints from which said information was received based on a set of subscores, each of said subscores associated with one of a plurality of dimensions, each of said dimensions relating to a particular set of characteristics of a given of said plurality of endpoints;
ranking each of said endpoints from most secure to least secure based on said Relative Scores;
comparing said subscores to a set of subscores from other distributed systems to generate an Absolute Score; and
displaying said Relative Score and said Absolute Score to at least one user.

14. The set of instructions of claim 13, wherein said Relative Score is a weighted sum of said subscores.

15. The set of instructions of claim 13, wherein said software application is smaller than 5 megabytes (MB).

16. The set of instructions of claim 13, wherein said software application is smaller than 2 megabytes (MB).

17. The set of instructions of claim 13, wherein said at least one dimension is selected from a set of dimensions comprising management (user hygiene), forensic readiness, defensibility, insider threat indicia, spear phishing surface, exfiltration potential, performance, dark web footprint, and valuable employee indicia.

18. The set of instructions of claim 17, wherein said set of dimensions further comprises physical security.

* * * * *